(12) United States Patent
Sakuda et al.

(10) Patent No.: US 9,783,221 B2
(45) Date of Patent: Oct. 10, 2017

(54) STEERING SYSTEM AND TOOTH MEMBER

(71) Applicant: JTEKT CORPORATION, Osaka-shi, Osaka (JP)

(72) Inventors: Masayoshi Sakuda, Kashihara (JP); Atsumune Nagatani, Kashihara (JP); Yu Myohoji, Habikino (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/216,090

(22) Filed: Jul. 21, 2016

(65) Prior Publication Data
US 2017/0029010 A1 Feb. 2, 2017

(30) Foreign Application Priority Data

Jul. 29, 2015 (JP) ................................ 2015-149823
Apr. 27, 2016 (JP) ................................ 2016-089424

(51) Int. Cl.
*B62D 1/184* (2006.01)
*B62D 1/19* (2006.01)

(52) U.S. Cl.
CPC ............ *B62D 1/184* (2013.01); *B62D 1/195* (2013.01)

(58) Field of Classification Search
CPC ................................ B62D 1/184; B62D 1/195
See application file for complete search history.

(56) References Cited

U.S. PATENT DOCUMENTS

| 8,505,408 B2 * | 8/2013 | Havlicek | B62D 1/184 280/775 |
| 2008/0231030 A1 * | 9/2008 | Menjak | B62D 1/184 280/775 |
| 2010/0275721 A1 * | 11/2010 | Davies | B62D 1/184 74/493 |
| 2011/0041642 A1 | 2/2011 | Havlicek | |
| 2012/0125139 A1 * | 5/2012 | Tinnin | B62D 1/195 74/493 |
| 2012/0125140 A1 * | 5/2012 | Ridgway | B62D 1/195 74/493 |

(Continued)

FOREIGN PATENT DOCUMENTS

| JP | 2007-238012 A | 9/2007 |
| JP | 2014-144761 A | 8/2014 |

OTHER PUBLICATIONS

Nov. 25, 2016 Extended Search Report issued in European Patent Application No. 16181246.6.

*Primary Examiner* — Faye M Fleming
(74) *Attorney, Agent, or Firm* — Oliff PLC

(57) ABSTRACT

In a steering system, a pair of first tooth rows that is movable integrally with an upper jacket includes first teeth each of which has a tooth trace extending in an up-down direction Z and which is arranged at a pitch in an axial direction. A tooth member shaped by compression molding includes a pair of second teeth provided on respective side surfaces of a pair of side surfaces of a body portion supported by a lower jacket, the side surfaces extending parallel to each other. The second teeth mesh with the respective first tooth rows in accordance with operation of an operation member that regulates extension and contraction of a column jacket. The second teeth have tooth tips displaced from each other by a distance shorter than a predetermined pitch.

5 Claims, 7 Drawing Sheets

(56) References Cited

U.S. PATENT DOCUMENTS

| | | | |
|---|---|---|---|
| 2014/0076092 A1* | 3/2014 | Kwon | B62D 1/187 74/493 |
| 2016/0144886 A1* | 5/2016 | Tomiyama | B62D 1/187 74/493 |
| 2016/0214640 A1* | 7/2016 | Sakuda | B62D 1/184 |
| 2016/0288817 A1* | 10/2016 | Myohoji | B62D 1/184 |
| 2016/0288820 A1* | 10/2016 | Myohoji | B62D 1/195 |
| 2016/0288821 A1* | 10/2016 | Sakuda | B62D 1/185 |

* cited by examiner

STEERING SYSTEM AND TOOTH MEMBER

INCORPORATION BY REFERENCE

The disclosure of Japanese Patent Applications No. 2015-149823 filed on Jul. 29, 2015 and No. 2016-089424 filed on Apr. 27, 2016 including the specification, drawings and abstract, are incorporated herein by reference in its entirety.

BACKGROUND OF THE INVENTION

1. Field of the Invention

The invention relates to a steering system and a tooth member used for the steering system.

2. Description of the Related Art

In a steering column apparatus described in Japanese Patent Application Publication No. 2007-238012 (JP 2007-238012 A), a steering shaft that couples a steering wheel and a steering mechanism together is inserted through a column body. To a side portion of the column body, a plate-like telescopic gear base is fixed which has a plurality of teeth formed on each of opposite sides thereof. The column body is provided with slots extending in a telescoping direction and through which a shaft with an operation lever attached thereto is inserted. A telescopic gear member is fixed to the operation lever in association with the telescopic gear base. The telescopic gear member has, on a surface thereof that faces the teeth of the telescopic gear base, a plurality of teeth arranged at the same pitch as the teeth of the telescopic gear base are arranged. Pivoting the operation lever causes the telescopic gear member to mesh with the telescopic gear base. Consequently, telescopic position adjustment for the column body is restricted.

In the steering system described in JP 2007-238012 A, the teeth of the telescopic gear member are meshed with teeth of a tooth member with the teeth formed on opposite surfaces thereof such as the telescopic gear base in order to restrict extension and contraction of a column jacket such as the column body after the telescopic position adjustment is performed. Portions of the tooth member in which tops of the teeth are formed are different in thickness from portions of the tooth member in which roots of the teeth are formed. Thus, for example, when a tooth member is formed by compression molding, the portions of the tooth member in which the tops of the teeth are formed are different from the portions of the tooth member in which the roots of the teeth are formed in compressibility in compression molding, in other words, density. Therefore, mechanical performance such as the strength of the tooth member in a direction in which the teeth are arranged may be unstable, in turn making the strength of meshing between the tooth member and the telescopic gear base unstable.

SUMMARY OF THE INVENTION

An object of the invention is to provide a steering system in which teeth mesh with one another to restrict extension and contraction of a column jacket and which allows the strength of meshing between the teeth to be stabilized. Another object of the invention is to provide a tooth member that allows the strength thereof to be stabilized.

According to an aspect of the invention, a steering system includes: a steering shaft to which a steering member is coupled at an end of the steering shaft and which is enabled can extend and contract in an axial direction; a column jacket having an upper jacket that is located near the steering member in the axial direction and holds the steering shaft and a lower jacket that is located away from the steering member in the axial direction and holds the steering shaft, the column jacket being enabled to extend and contract in the axial direction along with the steering shaft as a result of movement of the upper jacket with respect to the lower jacket; a bracket that supports the lower jacket and that is fixed to a vehicle body; an operation member that is operated to restrict extension and contraction of the column jacket; a pair of first tooth rows including a plurality of first teeth, the first teeth each having a tooth trace extending in a crossing direction crossing the axial direction, the first teeth being arranged at a predetermined pitch in the axial direction, the first tooth rows extending parallel to each other and being movable integrally with the upper jacket in the axial direction; and a tooth member including a block-like body portion supported by the lower jacket and a pair of second teeth provided on a pair of side surfaces of the body portion, the side surfaces extending parallel to each other such that at least one second tooth is provided on each of the side surfaces, the tooth member being shaped by compression molding and moving in accordance with operation of the operation member to allow the second teeth to mesh with the respective first tooth rows. The second teeth have tooth tips displaced from each other by a distance shorter than the predetermined pitch.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
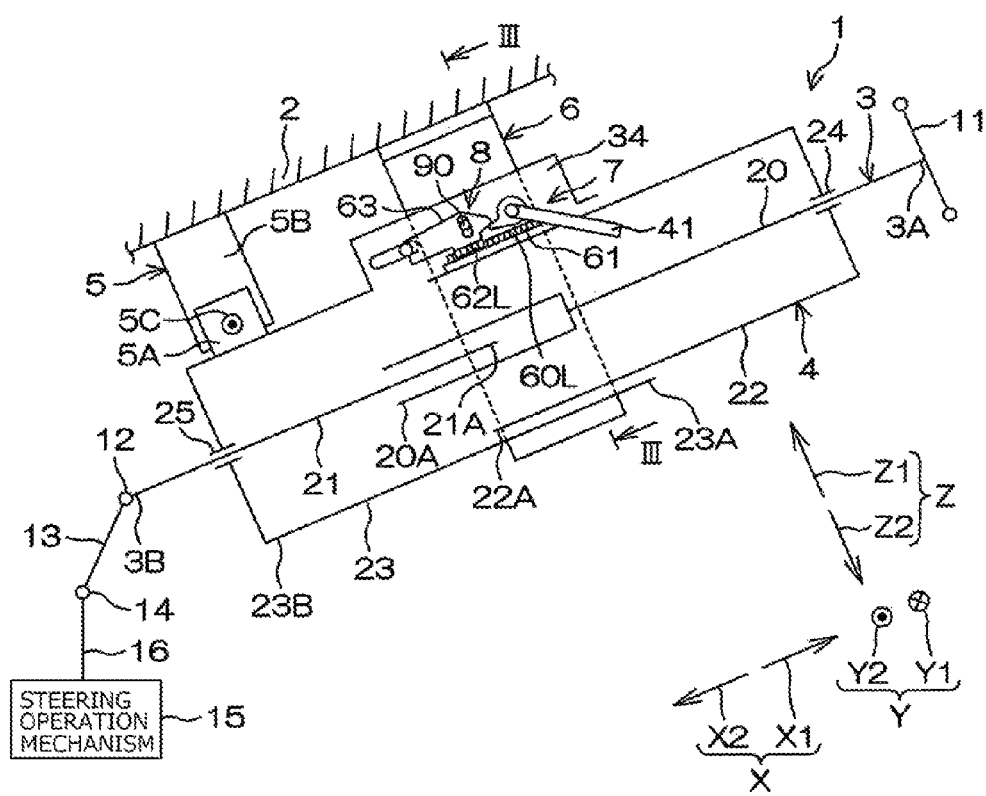
FIG. 1 is a side view schematically depicting a configuration of a steering system according to an embodiment of the invention.

An embodiment of the invention will be described below with reference to the attached drawings. FIG. 1 is a side view schematically depicting a configuration of a steering system 1 according to an embodiment of the invention. In FIG. 1, the left side of the drawing plane corresponds to a front side of a vehicle body 2 to which a steering system 1 is attached, and the right side of the drawing plane corresponds to a rear side of a vehicle body 2. The upper side of the drawing plane corresponds to an upper side of a vehicle body 2. The lower side of the sheet corresponds to a lower side of a vehicle body 2.

As seen in FIG. 1, the steering system 1 mainly includes a steering shaft 3, a column jacket 4, a lower bracket 5, an upper bracket 6, a clamping mechanism 7, and a tooth lock mechanism 8. A steering member 11 such as a steering wheel is coupled to a first end 3A of the steering shaft 3 that is a rear end of the steering shaft 3. A second end 3B of the steering shaft 3 that is a front end of the steering shaft 3 is coupled to a pinion shaft 16 of a steering operation mechanism 15 via a universal joint 12, an intermediate shaft 13, and a universal joint 14 in this order.

The steering operation mechanism 15 includes a rack-and-pinion mechanism. The steering operation mechanism 15 steers steered wheels (not depicted in the drawings) such as tires in accordance with transmitted rotation of the steering shaft 3. The steering shaft 3 extends in a front-rear direction of a vehicle body 2. In the following description, a direction in which the steering shaft 3 extends is designated as an axial direction X of the steering shaft 3. The axial direction X is inclined with respect to the horizontal direction such that the second end 3B is lower than the first end 3A. A rear side corresponding to a side of the first end 3A in the axial direction is denoted by reference character X1. A front side that is opposite to the first end 3A in the axial direction X is denoted by reference character X2.

Among directions crossing the axial direction X, a direction perpendicular to the drawing plane of FIG. 1 is designated as a lateral direction Y, and a direction extending substantially in an up-down direction in FIG. 1 is designated as an up-down direction Z. In the lateral direction Y, a side away from the viewer in FIG. 1 corresponds to a right side Y1, and a side closer to the viewer in FIG. 1 corresponds to a left side Y2. In the up-down direction Z, an upper side is denoted by reference character Z1 and a lower side is denoted by reference character Z2. In the figures other than FIG. 1, directions corresponding to the axial direction X, the rear side X1, the front side X2, the lateral direction Y, the right side Y1, the left side Y2, the up-down direction Z, the upper side Z1, and the lower side Z2 are denoted by the same reference characters as those in FIG. 1.

The steering shaft 3 includes an upper shaft 20 and a lower shaft 21 that extend in the axial direction X. The upper shaft 20 is positioned on the rear side X1 with respect to the lower shaft 21. A rear end 21A of the lower shaft 21 is inserted from the front side X2 into a front end 20A of the upper shaft 20 that is cylindrically shaped. The lower shaft 21 is coupled to the upper shaft 20 by spline fitting or serration fitting. Thus, the upper shaft 20 and the lower shaft 21 are integrally rotatable and relatively movable along the axial direction X. The upper shaft 20 moves with respect to the lower shaft 21 in the axial direction X to enable extension and contraction of the steering shaft 3 along the axial direction X.

The column jacket 4 houses a steering shaft 3. The column jacket 4 has an upper jacket 22 and a lower jacket 23 that extend in the axial direction X. The upper jacket 22 is positioned on the rear side X1 with respect to the lower jacket 23. A front end 22A of the upper jacket 22 is fitted in the lower jacket 23 by being inserted into the lower jacket 23 from the rear side X1.

The column jacket 4 supports and holds the steering shaft 3 via a bearing 24 and a bearing 25 so that the steering shaft 3 is rotatable. Specifically, the upper jacket 22 supports the upper shaft 20 via the bearing 24 so that the upper shaft 20 is rotatable and holds the upper shaft 20 on the rear side X1.

The lower jacket 23 supports the lower shaft 21 via the bearing 25 so that the lower shaft 21 is rotatable and holds the lower shaft 21 on the front side X2.

The upper shaft 20 and the upper jacket 22, which are coupled together, are movable in the axial direction X with respect to the lower shaft 21 and the lower jacket 23. Consequently, the column jacket 4 can extend and contract along with the steering shaft 3. An extending and contracting operation of the steering shaft 3 and the column jacket 4 in the specification is referred to as a telescopic operation. Position adjustment, in the axial direction X, for the steering member 11 that is coupled to the first end 3A of the steering shaft 3 is referred to as telescopic adjustment.

The lower bracket 5 includes a lateral pair of movable brackets 5A (see also FIG. 2 described below), a fixed bracket 5B, and a central shaft 5C. The movable brackets 5A are fixed to an upper outer peripheral surface of a front end 23B of the lower jacket 23. The fixed bracket 5B is fixed to the vehicle body 2. The central shaft 5C extends in the lateral direction Y. The central shaft 5C is passed between the movable brackets 5A so as to penetrate the fixed bracket 5B. Consequently, the front end 23B of the lower jacket 23 is coupled to the vehicle body 2.

The movable brackets 5A are supported by the fixed bracket 5B so as to be able to pivot around the central shaft 5C. Thus, the column jacket 4 as a whole can pivot around the central shaft 5C in conjunction with the steering shaft 3 with respect to the fixed bracket 5B and the upper bracket 6. Such pivoting of the column jacket 4 using the central shaft 5C as a support is referred to as tilting. A substantial up-down direction along a circular arc around the central shaft is referred to as a tilt direction.

Tilting-based position adjustment for the steering member 11 in the tilt direction is referred to as tilt adjustment. Pivoting the column jacket 4 along the tilt direction enables tilt adjustment. The lower jacket 23 is coupled to the vehicle body 2 via the lower bracket 5 and thus cannot move in the axial direction X. Thus, during the telescopic adjustment, the upper jacket 22 actually moves.

Figure 2:
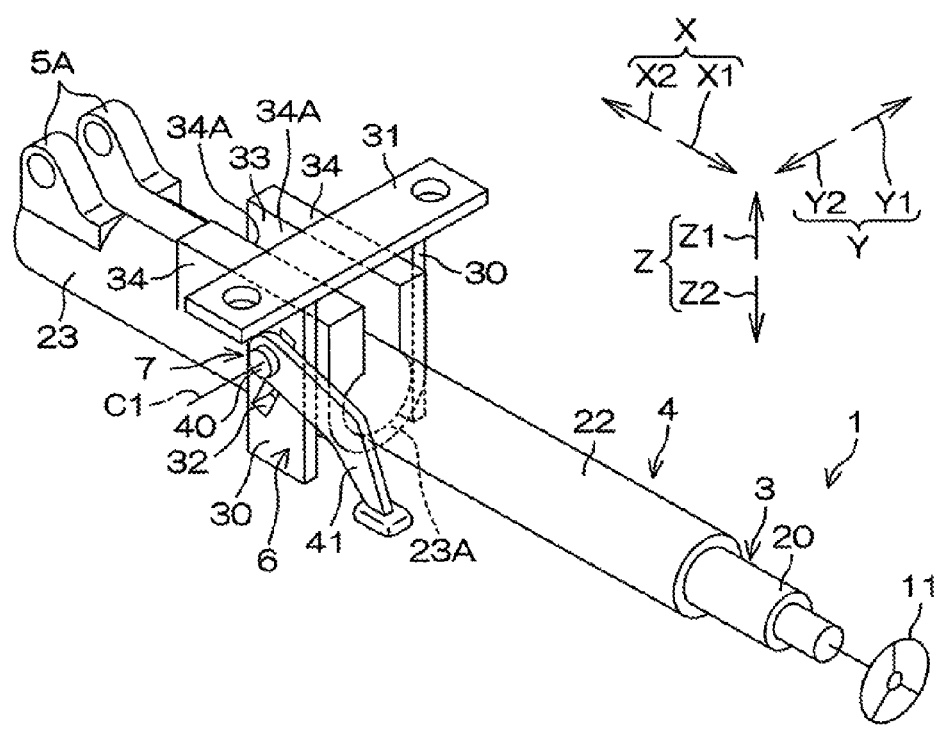
FIG. 2 is a perspective view of the steering system.

The upper bracket 6 supports a rear end 23A of the lower jacket 23 to couple the rear end 23A to the vehicle body 2. As seen in FIG. 2 that is a perspective view of the steering system 1, the upper bracket 6 integrally includes a pair of side plates 30 and a coupling plate 31 that is thin in the up-down direction Z. The side plates 30 are thin in the lateral direction Y and are disposed on opposite sides of the rear end 23A of the lower jacket 23 in the lateral direction Y. The coupling plate 31 is coupled to an upper end of each of the side plates 30.

Tilt grooves 32 are formed in the respective side plates 30 at the same position as viewed in the lateral direction Y (see also FIG. 3 described below). Each of the tilt grooves 32 extends in a circular arc along the tilt direction. The coupling plate 31 has portions extending outward in the lateral direction Y with respect to the respective side plates 30. The upper bracket 6 as a whole is fixed to the vehicle body 2 (see FIG. 1) using bolts or the like inserted through these portions and not depicted in the drawings.

In an upper outer peripheral surface of the lower jacket 23, a slit 33 is formed which extends all over the lower jacket 23 in the axial direction X and penetrating the lower jacket 23 in the up-down direction Z. At the rear end 23A of the lower jacket 23, a pair of extension portions 34 is integrally provided which extends toward the upper side Z1 while defining the slit 33 in the lateral direction Y. Each of the extension portions 34 is shaped like a plate that extends in the axial direction X and the up-down direction Z and that is thin in the lateral direction Y. The extension portions 34 are arranged between the side plates 30 and have respective facing surfaces 34A that face each other in the lateral direction Y. Each of the extension portions 34 faces a corresponding one of the side plates 30 in the lateral direction that is positioned on the same side in the lateral direction Y as the extension portion 34.

Figure 3:
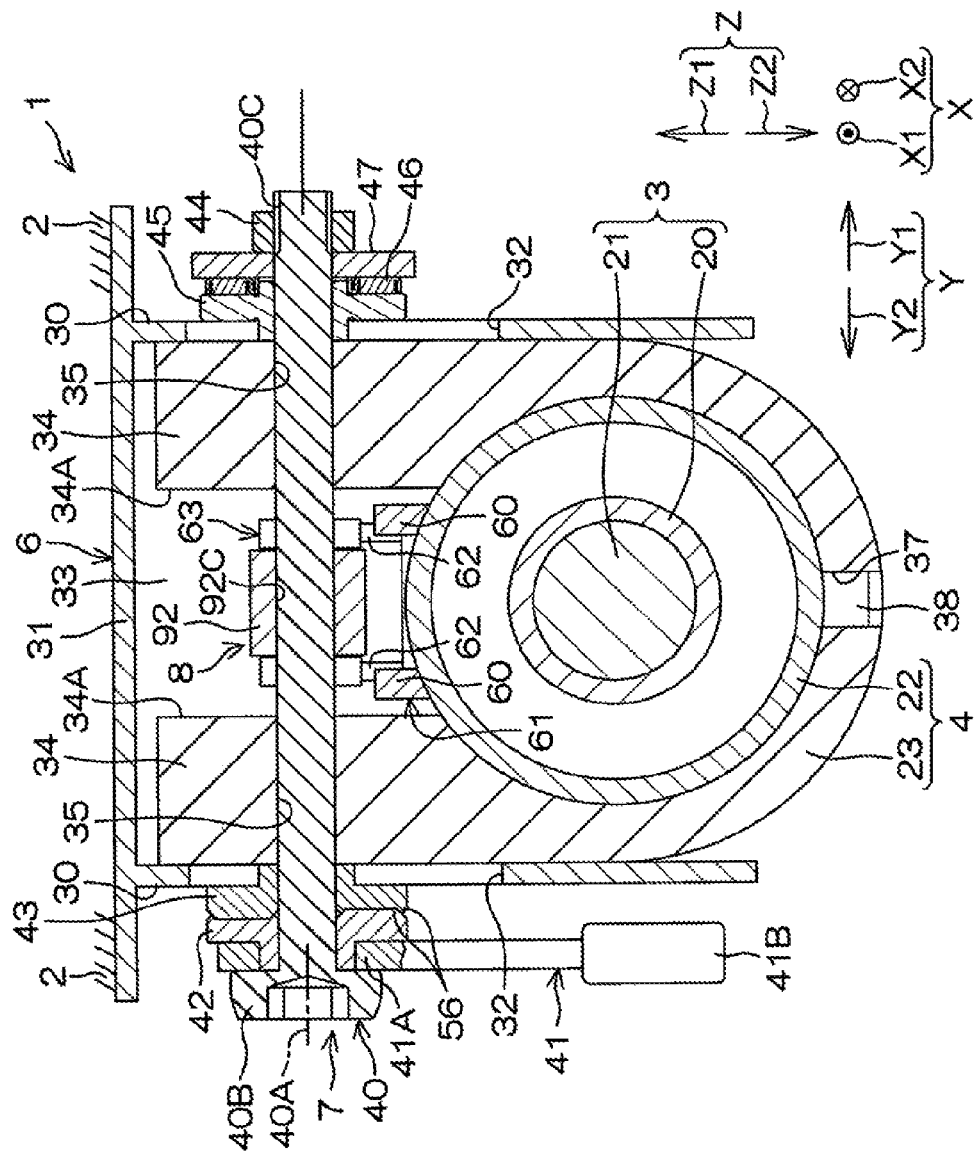
FIG. 3 is a sectional view taken along the line III-III in FIG. 1.

FIG. 3 is a sectional view taken along the line III-III in FIG. 1. As seen in FIG. 3, in each of the extension portions 34 at the same position as viewed in the lateral direction Y, circular insertion holes 35 are formed in the respective extension portions 34 so as to penetrate the extension portion 34 in the lateral direction Y and to be at the same location as viewed in the lateral direction Y. The insertion holes 35 in the extension portions 34 overlap a part of the tilt grooves 32 in the side plates 30 as viewed in the lateral direction Y.

A guide groove 37 extending in the axial direction X is formed in a lower side Z2 portion of the lower jacket 23. A guided protrusion 38 fixed to the upper jacket 22 is inserted through the guide groove 37. The guide groove 37 restricts rotation of the upper jacket 22 with respect to the lower jacket 23 while guiding, via the guided protrusion 38, movement of the upper jacket 22 in the axial direction X. An end (not depicted in the drawings) of the guide groove 37 in the axial direction comes into contact with the guided protrusion 38 to prevent the upper jacket 22 from slipping out from the lower jacket 23.

The clamping mechanism 7 is a mechanism that allows unlocking of the position of the steering member 11 (see FIG. 1) for tilt adjustment and telescopic adjustment and that allows locking of the position of the steering member 11 for which the tilt adjustment or the telescopic adjustment has been completed. The clamping mechanism 7 includes a tilt bolt 40, an operation member 41, a cam 42 and a cam follower 43 shaped like rings, a nut 44, a ring-like interposition member 45, a needle roller bearing 46, and a thrust washer 47.

The tilt bolt 40 is a metal bolt having a central axis 40A extending in the lateral direction Y. The tilt bolt 40 is provided with a head portion 40B at a left end thereof and a thread groove 40C at a right end of an outer peripheral surface of the tilt bolt 40. A portion of the tilt bolt 40 that is located on the right side Y1 with respect to the head portion 40B is inserted through the tilt grooves 32 in the side plates 30 and the insertion holes 35 in the extension portions 34 at a position on the upper side Z1 with respect to the steering shaft 3. In this state, the head portion 40B is positioned on the left side Y2 with respect to the left-side-Y2 side plate 30, and the thread groove 40C is positioned on the right side Y1 with respect to the right-side-Y1 side plate 30.

The operation member 41 is, for example, a lever that can be gripped. The operation member 41 includes a base end 41A that is a first end in a longitudinal direction and a gripping portion 41B that is a second end in the longitudinal direction. The base end 41A of the operation member 41 is attached to a vicinity of the head portion 40B of the tilt bolt 40. A driver grips the gripping portion 41B of the operation member 41 to operate the operation member 41. Consequently, in accordance with operation of the operation member 41, the tilt bolt 40 is rotated in conjunction with the operation member 41.

A left end of the tilt bolt 40 is inserted through the cam 42 and the cam follower 43. Between the head portion 40B and the left-side-Y2 side plate 30, the cam 42 and the cam follower 43 are arranged in this order from the left side Y2. The cam 42 is rotatable integrally with the tilt bolt 40, whereas the cam follower 43 is rotatable relative to the tilt bolt 40 and movable in the lateral direction Y. However, a width across flats is formed on a portion of the cam follower 43 that is inserted through the tilt groove 32 in the left-side-Y2 side plate 30 so that the tilt groove 32 prevents the cam follower 43 from running idly.

A nut 44 is attached over the thread groove 40C in the tilt bolt 40. Between the nut 44 and the right-side-Y1 side plate 30, the interposition member 45, the needle roller bearing 46, and the thrust washer 47 are arranged in this order from the left side Y2. The tilt bolt 40 is inserted through each of the interposition member 45, the needle roller bearing 46, and the thrust washer 47. The tilt bolt 40 is movable through the tilt grooves 32 in the upper bracket 6 in the above-described tilt direction. When the driver moves the steering member 11 (see FIG. 11) in the tilt direction for tilt adjustment, the column jacket 4 as a whole is tilted relative to the upper bracket 6. Tilt adjustment for the steering member 11 is performed to the extent that the tilt bolt 40 is movable in the tilt grooves 32.

When the driver operates and rotates the operation member 41 after performing the telescopic adjustment or the tilt adjustment, the cam 42 rotates to allow cam protrusions 56 of the cam 42 and the cam follower 43 to ride onto each other. Consequently, the cam follower 43 moves toward the right side Y1 along the tilt bolt 40, which extends in the lateral direction Y, to press a left side surface of the left-side-Y2 side plate 30 from the left side Y2. This reduces a distance between the cam follower 43 and the interposition member 45 in the lateral direction Y. The side plates 30 are clamped between the cam follower 43 and the interposition member 45 from the opposite sides in the lateral direction Y. In this state, each side plate 30 and the corresponding extension portion 34 are frictionally held together, and the lower jacket 23 and the upper jacket 22 are frictionally held together, which are reduced in diameter in conjunction with the clamping. Consequently, pivoting and extension and contraction of the column jacket 4 are restricted, so that the steering member 11 (see FIG. 1) is immovable in the tilt direction and the axial direction X.

A state of the steering system 1 where the steering member 11 is locked in position in the tilt direction and the axial direction X as described above is referred to as a locked state. During normal operation, the steering system 1 is in the locked state. In the steering system 1 in the locked state, when the operation member 41 is operated and rotated in a direction opposite to the above-described direction, the cam 42 rotates relative to the cam follower 43 to release the riding of the cam protrusions 56 of the cam 42 and the cam follower 43 onto each other. Consequently, the cam follower 43 moves from a locked position toward the left side Y2 along the tilt bolt 40. In conjunction with movement of the cam follower 43, the interposition member 45 moves toward the right side Y1 along the tilt bolt 40. This increases the distance between the cam follower 43 and the interposition member 45 to release the clamping of the side plates 30 between the cam follower 43 and the interposition member 45. In this state, the frictional holding of each side plate 30 and the corresponding extension portion 34 and the frictional holding of the lower jacket 23 and the upper jacket 22 are released. Thus, pivoting and extension and contraction of the column jacket 4 are enabled, so that the steering member 11 is movable in the tilt direction and the axial direction X. As a result, the telescopic adjustment and the tilt adjustment are enabled again.

Figure 4:
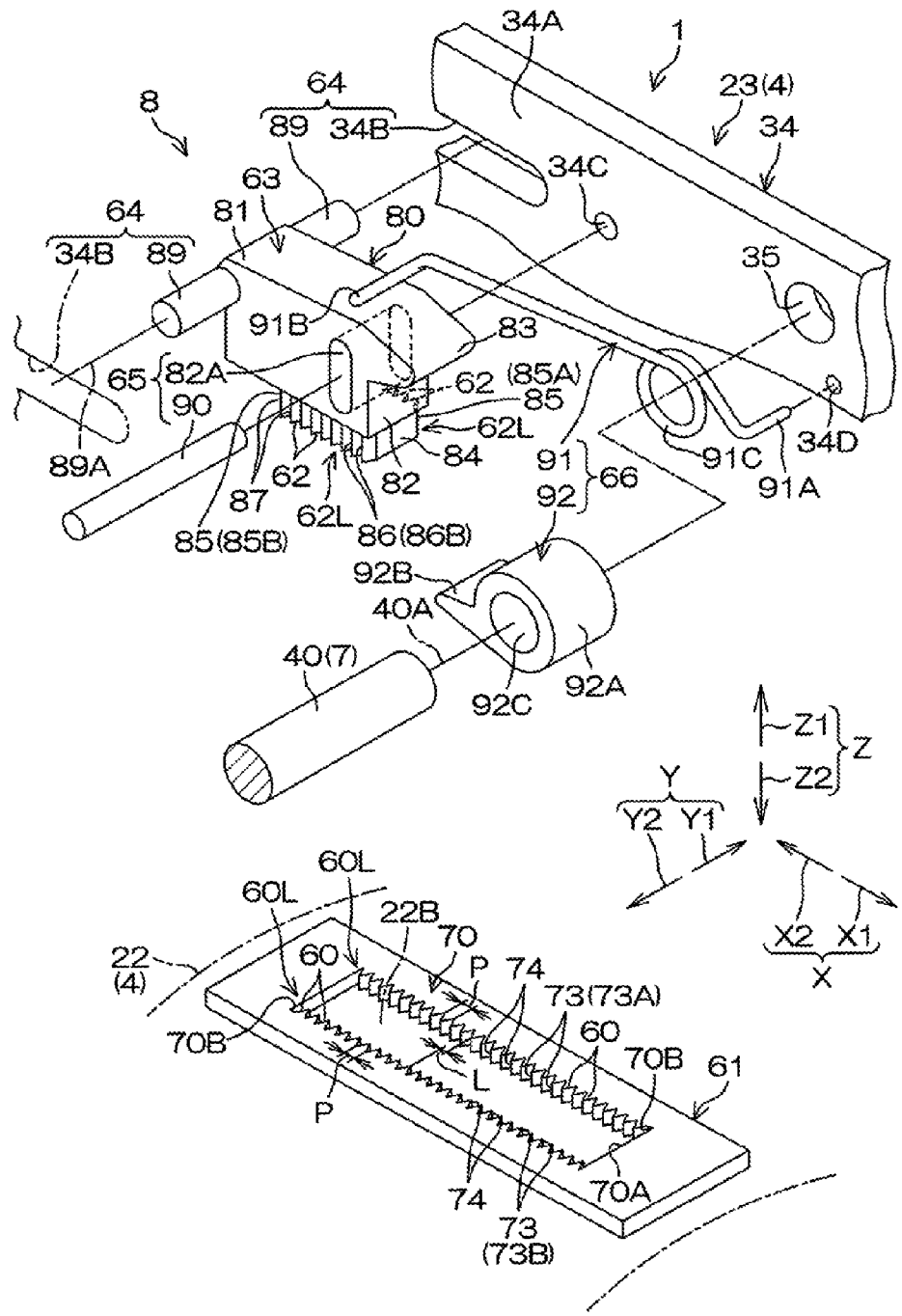
FIG. 4 is an exploded perspective view of a periphery of a tooth lock mechanism.

A state of the steering system 1 where fixation of the position of the steering member 11 in the tilt direction and the axial direction A is released is referred to as a released state. A configuration of the tooth lock mechanism 8 will be described below in detail. As seen in FIG. 4 that is an exploded perspective view of a periphery of the tooth lock mechanism 8, the tooth lock mechanism 8 includes a tooth plate 61 and a tooth member 63. The tooth plate 61 has first teeth 60. The tooth member 63 has second teeth 62 serving as a tooth portion that can mesh with the first teeth 60. The tooth lock mechanism 8 includes a support mechanism 64, a guide mechanism 65, and an interlocking mechanism 66. The support mechanism 64 supports the tooth member 63. The guide mechanism 65 guides a part of the tooth member 63 in the up-down direction Z. The interlocking mechanism 66 interlocks rotation of the tilt bolt 40 with motion of the tooth member 63.

The tooth plate 61 includes a flat-plate-like body portion 70 that is longitudinal in the axial direction X and a pair of first tooth rows 60L including a plurality of first teeth 60. The body portion 70 is provided with a through-hole 70A that penetrates the body portion 70 in the up-down direction Z. The through-hole 70A is shaped like a rectangle that is longitudinal in the axial direction X as viewed in the up-down direction Z. The first tooth rows 60L are provided at respective opposite edges 70B of the through-hole 70A in the lateral direction Y. The first tooth rows 60L extend parallel to each other in the axial direction X so as to lie at a distance from each other in the lateral direction Y The first teeth 60 of each of the first tooth rows 60L are shaped like what is called lateral teeth each having, as a tooth tip 73, a tooth trace 74 extending in the up-down direction Z. The first teeth 60 of the right-side-Y1 first tooth row 60L protrude from the right-side-Y1 edge 70B into the through-hole 70A. A tooth tip 73A of each of the first teeth 60 is directed toward the left side Y2. The first teeth 60 of the left-side-Y2 first tooth row 60L protrude from the left-side-Y2 edge 70B into the through-hole 70A. A tooth tip 73B of each of the first teeth 60 is directed toward the right side Y1.

In each first tooth row 60L, the first teeth 60 are arranged at a predetermined pitch P in the axial direction X. In the axial direction X, the tooth tips 73A of the first teeth 60 of the right-side-Y1 first tooth row 60L are displaced from the tooth tips 73B of the first teeth 60 of the left-side-Y2 first tooth row 60L by a distance L corresponding to half of a pitch P. The distance L need not necessarily be half of the pitch P as in the present embodiment. Any distance L may be set so long as the distance L is shorter than the pitch P.

The tooth plate 61 is disposed between the extension portions 34 as viewed in the axial direction X (see FIG. 3), and is fixed to an outer peripheral surface of the upper jacket 22 by welding or the like. Thus, the tooth plate 61 is movable integrally with the upper jacket 22 in the axial direction X. The tooth plate 61 may be fixed to an outer peripheral surface 22B of the upper jacket 22 using bolts or the like not depicted in the drawings. The tooth plate 61 may be formed of the same material as the upper jacket 22 so as to be formed integrally with the upper jacket 22.

The tooth member 63 includes a block-like body portion 80 and a pair of second tooth rows 62L including a plurality of second teeth 62. The tooth member 63 is shaped by compression molding such as sintering or forging. The tooth member 63 in the present embodiment is, for example, a sintered compact. Thus, the second tooth rows 62L and the body portion 80 may be integrally formed into a sintered compact. The body portion 80 includes a first portion 81 and a second portion 82 adjacent to the first portion 81 on the rear side X1 thereof. The second portion 82 includes, as a rear end thereof, an engagement protrusion 83 protruding toward the rear side X1. The second portion 82 includes a tooth forming portion 84 as a lower end of the second portion 82.

Figure 5:
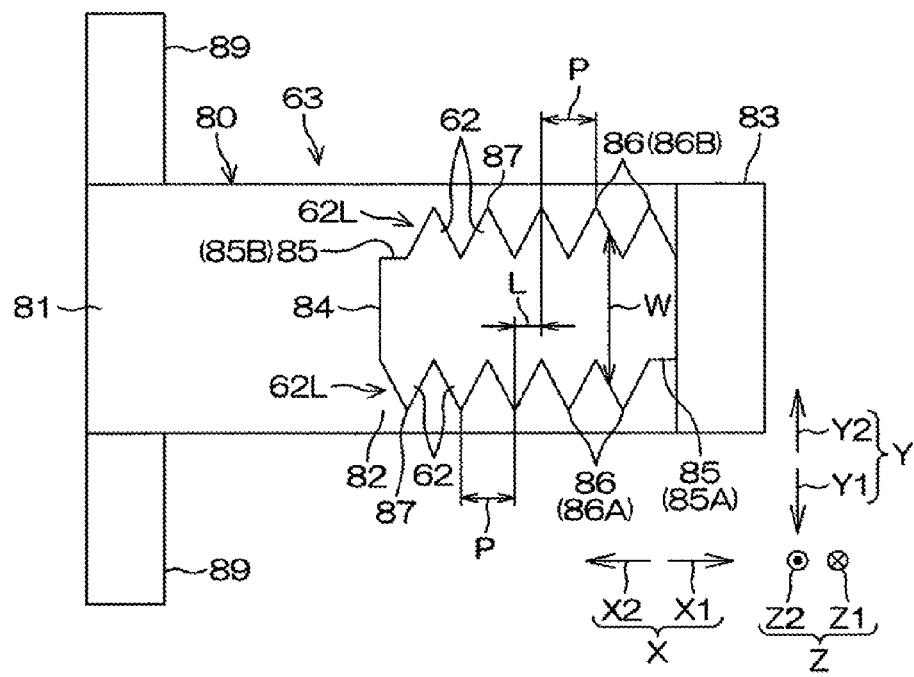
FIG. 5 is a diagram of a tooth member as viewed from below.

As seen in FIG. 5 of the tooth member 63 as viewed from the lower side Z2, the tooth forming portion 84 includes a pair of side surfaces 85 as opposite side surfaces in the lateral direction Y The side surfaces 85 extend parallel to each other in the tooth forming portion 84. A direction in which the side surfaces 85 extend is parallel to the axial direction X. The right-side-Y1 side surface 85A is also a part of a right side surface that is an example of one of the side surfaces of the body portion 80. The left-side-Y2 side surface 85B is also a part of a left side surface that is an example of the other side surface of the body portion 80.

The second tooth rows 62L are provided on the respective side surfaces 85 of the tooth forming portion 84. The right-side-Y1 second tooth row 62L is provided on the right-side-Y1 side surface 85A. The left-side-Y2 second tooth row 62L is provided on the left-side-Y2 side surface 85B. The second teeth 62 of each of the second tooth rows 62L are shaped like what is called lateral teeth (see also FIG. 4) each having, as a tooth tip 86, a tooth trace 87 extending in the up-down direction Z. The second teeth 62 of the right-side-Y1 second tooth row 62L protrude from the right-side-Y1 side surface 85A toward the right side Y1, with tooth tips 86A of the second teeth 62 directed toward the right side Y1. The second teeth 62 of the left-side-Y2 second tooth row 62L protrude from the left-side-Y2 side surface 85B toward the left side Y2, with tooth tips 86B of the second teeth 62 directed toward the left side Y2.

The second teeth 62 of the second tooth row 62L on the right-side-Y1 side surface 85A are arranged at the above-described predetermined pitch P in the axial direction X. The second teeth 62 of the second tooth row 62L on the left-side-Y2 side surface 85B are also arranged at the above-described predetermined pitch P in the axial direction X. In the axial direction X, the tooth tips 86A of the second teeth 62 of the right-side-Y1 second tooth row 62L are displaced from the tooth tips 86B of the second teeth 62 of the left-side-Y2 second tooth row 62L by a distance L corresponding to half of the pitch P. In other words, the second tooth rows 62L are configured such that the second teeth 62 of the right-side-Y1 second tooth row 62L and the second teeth 62 of the left-side-Y2 second tooth row 62L are staggered.

When the tooth member 63 as described above is shaped by sintering, powdery metal is pressurized in a mold by sintering. The tooth member 63 is shaped such that the second teeth 62 undulate in a pressurizing direction (corresponding to the lateral direction Y). Now, unlike the tooth member 63 in the present embodiment, a tooth member in a comparative example is assumed in which tooth rows of a tooth member are shaped such that the second teeth 62 of the right-side-Y1 second tooth row 62L are not displaced from the second teeth 62 of the left-side-Y2 second tooth row 62L. In the tooth member in the comparative example, the positions of the tooth tips in the right-side-Y1 tooth row of the tooth member in the axial direction X are identical to the positions of the tooth tips in the left-side-Y2 tooth row in the axial direction X. The tooth member significantly varies in thickness between a peak portion where the tooth tip is formed and a trough portion where a dedendum is formed. That is, the thickness of the tooth member significantly varies in the axial direction X. A density corresponding to the compressibility of the tooth member in compression molding is uneven in the direction in which the teeth are arranged. Specifically, the density of the tooth member is high at the peak portion and low at the trough portion.

As seen in FIG. 5, when the distance L is shorter than the pitch P, a thickness W in the lateral direction Y can be made as uniform as possible at any positions in the axial direction X. This prevents the density of the tooth forming portion 84 from varying according to the position in the axial direction X. Thus, the density of the second teeth 62 (tooth portion density) is stabilized to allow improvement of mechanical performance of the tooth member 63 such as the strength of the tooth forming portion 84 and the strength of the second teeth 62 (tooth portion strength).

In the present embodiment, the distance L corresponds to half of the pitch P. The thickness W of the tooth forming portion 84 in the lateral direction Y is substantially uniform at least in a range from the tooth tip 86A of the foremost tooth of the second teeth 62 to the tooth tip 86B of the rearmost tooth of the second teeth 62. This enables the density of the tooth member 63 shaped by compression molding to be further restrained from varying according to the position in the axial direction X.

As seen in FIG. 4, the tooth member 63 is disposed on the upper side Z1 with respect to the outer peripheral surface 22B of the upper jacket 22 and on the front side X2 with respect to the tilt bolt 40. The outer peripheral surface 22B of the upper jacket 22 is also a bottom surface of the through-hole 70A in the tooth plate 61. The support mechanism 64 includes a pair of support shafts 89 and a pair of first guide holes 34B. The support shafts 89 protrude from the first portion 81 of the body portion 80 of the tooth member 63 toward respective opposite outer sides in the lateral direction Y. The first guide holes 34B are formed in the respective extension portions 34 of the lower jacket 23. The support shafts 89 have a central axis 89A extending in the lateral direction Y The first guide holes 34B are slots extending in the axial direction X.

The support shafts 89 are inserted through the respective first guide holes 34B. Consequently, the support shafts 89 are supported by the respective extension portions 34 so as to be movable in the axial direction X parallel to the tilt bolt 40. The first portion 81 of the body portion 80 of the tooth member 63 is supported by the extension portions 34 via the support shafts 89.

The support shafts 89 may be provided separately from the tooth member 63. In this case, the support shafts 89 are configured to support the first portion 81 of the body portion 80 of the tooth member 63 by being inserted through a hole penetrating the tooth member 63 in the lateral direction Y and not depicted in the drawings. In connection with the guide mechanism 65, support holes 34C that are round holes are formed in the respective facing surfaces 34A of the extension portions 34. FIG. 4 depicts only the support hole 34C in the right-side-Y1 extension portion 34 for convenience of description.

The guide mechanism 65 includes a bar-like guide shaft 90 and a second guide hole 82A that is longitudinal in the up-down direction Z. The guide shaft 90 extends in the lateral direction Y. The second guide hole 82A is formed in the second portion 82 of the tooth member 63. Opposite ends of the guide shaft 90 in the lateral direction Y are inserted through the support holes 34C in the respective extension portions 34. Consequently, the guide shaft 90 is supported by the extension portions 34 so as to be immovable in the up-down direction Z. The interlocking mechanism 66 includes a biasing member 91 and a release member 92. The biasing member 91 biases the tooth member 63 around the central axis 89A of the support shafts 89 so that the second teeth 62 mesh with the first teeth 60. The release member 92 drives the tooth member 63 against a force of the biasing member 91 so as to release the meshing between the second teeth 62 and the first teeth 60.

In connection with the interlocking mechanism 66, a locking hole 34D is formed in the facing surface 34A of the right-side-Y1 extension portion 34. The biasing member 91 is, for example, a torsion spring. The biasing member 91 includes a first end 91A, a second end 91B, and a coil portion 91C. The first end 91A is locked in the locking hole 34D formed on the right-side-Y1 extension portion 34. The second end 91B biases the second portion 82 of the tooth member 63 toward the lower side Z2. The coil portion 91C is wound around the tilt bolt 40 between the first end 91A and the second end 91B.

The release member 92 includes an annular body 92A and a release protrusion 92B. The release protrusion 92B protrudes from an outer periphery of the body 92A. The body 92A has a through-hole 92C penetrating the body 92A in the lateral direction Y. The tilt bolt 40 is inserted through the through-hole 92C (see FIG. 3). The release member 92 is rotatable integrally with the tilt bolt 40. Specifically, a female spline not depicted in the drawings is formed on an inner peripheral surface of the body 92A. A male spline not depicted in the drawings is formed on an outer periphery of the tilt bolt 40. The body 92A and the tilt bolt 40 are spline-fitted together. The release protrusion 92B lies on the lower side Z2 with respect to the second portion 82 of the tooth member 63 so as to face the engagement protrusion 83 of the second portion 82.

Figure 6:
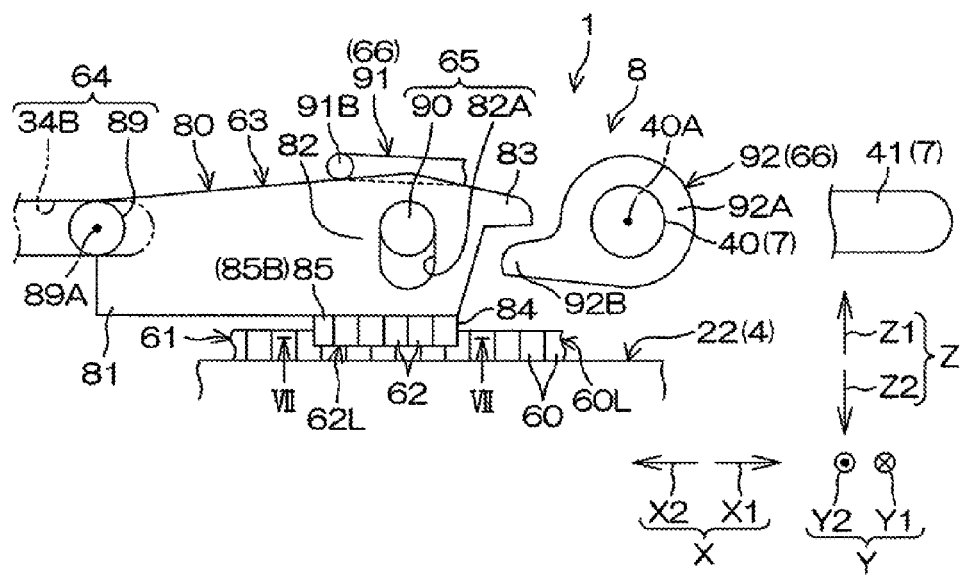
FIG. 6 is a schematic side view of the tooth lock mechanism illustrating that second teeth mesh with first teeth.

Operations of the tooth lock mechanism 8 will be described below. FIG. 6 is a schematic side view of the tooth lock mechanism 8 illustrating that the second teeth 62 are meshed with the first teeth 60. When the steering system 1 is in the locked state, the second portion 82 of the body portion 80 of the tooth member 63 is biased toward the lower side Z2 by the second end 91B of the biasing member 91 to allow the second teeth 62 of the tooth member 63 to mesh with the first teeth 60 of the tooth plate 61 as depicted in FIG. 6.

Figure 7:
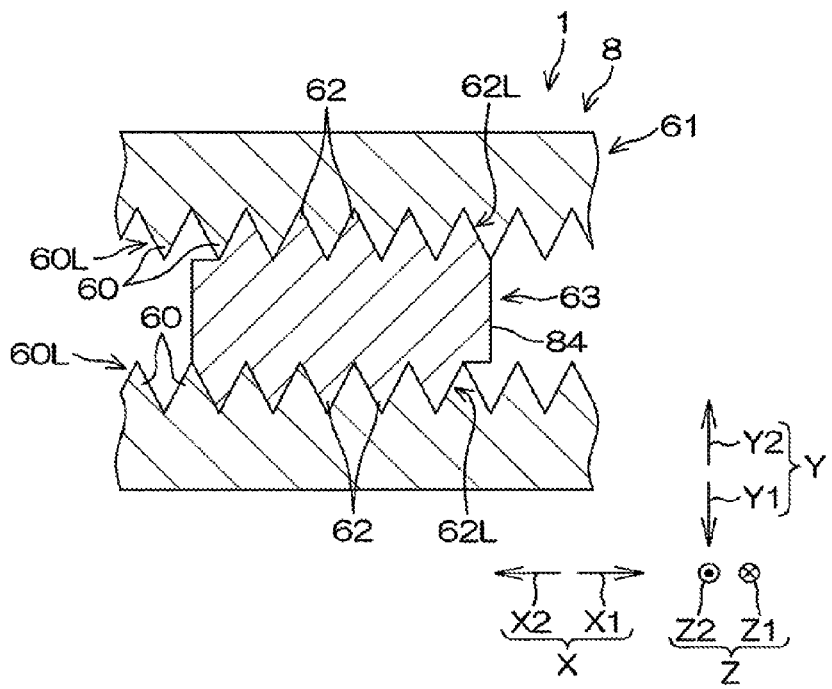
FIG. 7 is a sectional view taken along the line VII-VII in FIG. 6.

As seen in FIG. 7 that is a sectional view taken along the line VII-VII in FIG. 6, the second tooth rows 62L are meshed with the first tooth rows 60L. Specifically, with the right-side-Y1 second tooth row 62L meshed with the right-side-Y1 first tooth row 60L, the left-side-Y2 second tooth row 62L is meshed with the left-side-Y2 first tooth row 60L. As seen in FIG. 6, when the operation member 41 is rotated so as to change the steering system 1 from the locked state to the released state, the release member 92 rotates integrally with the tilt bolt 40 to move the release protrusion 92B of the release member 92 toward the upper side Z1. The release protrusion 92B moves toward the upper side Z1 to engage with the engagement protrusion 83.

Figure 8:
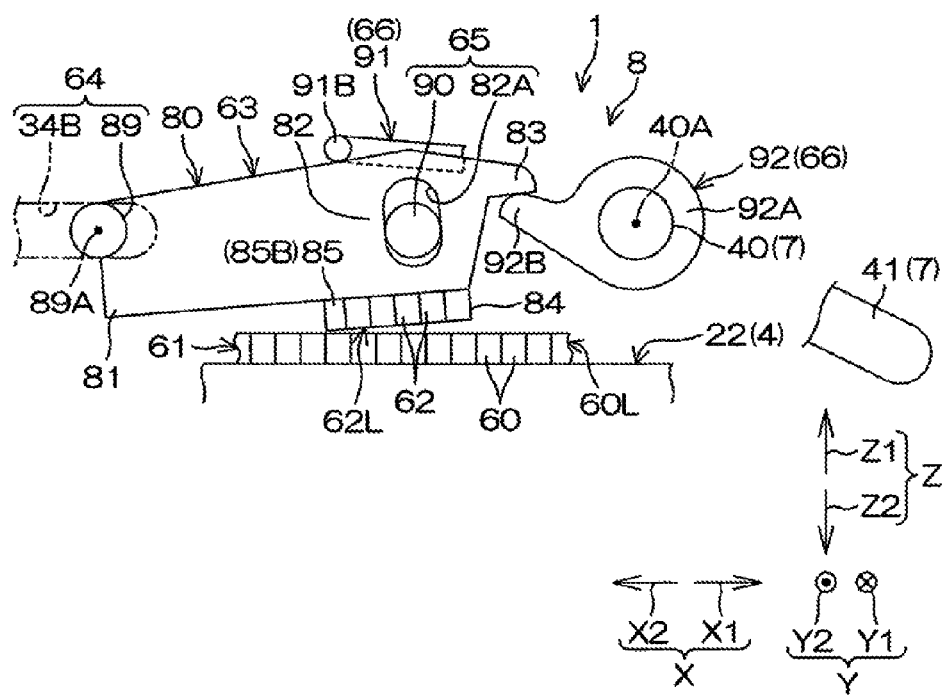
FIG. 8 is a schematic side view of the tooth lock mechanism illustrating that the meshing between the second teeth and the first teeth is released.

When the operation member 41 is further rotated in the same direction as described above, the release protrusion 92B pushes up the engagement protrusion 83 against the force of the biasing member 91. At this time, the guide shaft 90 relatively moves toward the lower side Z2 within the second guide hole 82A in the second portion 82 of the tooth member 63. Consequently, the second portion 82 is guided toward the upper side Z1. Thus, the second teeth 62 move toward the upper side Z1, and as depicted in FIG. 8 that is a schematic side view of the tooth lock mechanism 8, the meshing between the second teeth 62 and the first teeth 60 is released.

As described above, in the released state, the fixation, by the tooth lock mechanism 8, of the position of the upper jacket 22 with respect to the lower jacket 23 in the axial direction X is released. As seen in FIG. 8, in contrast, when the operation member 41 is rotated so as to change the steering system 1 from the released state to the locked state, the release member 92 rotates integrally with the tilt bolt 40 to move the release protrusion 92B of the release member 92 toward the lower side Z2. The second portion 82 of the tooth member 63, which has the engagement protrusion 83, is biased by the biasing member 91. Thus, the second portion 82 moves toward the lower side Z2 in conjunction with movement of the release protrusion 92B toward the lower side Z2. At this time, the guide shaft 90 relatively moves toward the upper side Z1 within the second guide hole 82A in the second portion 82 to guide the second portion 82 toward the lower side Z2. Consequently, the second teeth 62 move toward the lower side Z2, and the second teeth 62 of the second tooth rows 62L come into meshing engagement with the first teeth 60 of the first tooth rows 60L in the up-down direction Z (see FIG. 6).

As described above, in the locked state, the locking, by the tooth lock mechanism 8, of the position of the upper jacket 22 with respect to the lower jacket 23 in the axial direction X is achieved. In the present embodiment, as seen in FIG. 5, the tooth tips 86A of the second teeth 62 of the right-side-Y1 second tooth row 62L of the tooth member 63 are displaced from the tooth tips 86B of the second teeth 62 of the left-side-Y2 second tooth row 62L of the tooth member 63 by the distance L in the axial direction X, as described above. This enhances the strength of the second teeth 62. Therefore, in a configuration in which the second teeth 62 and the first teeth 60 mesh with one another to restrict extension and contraction of the column jacket 4, the meshing between the second teeth 62 and the first teeth 60 can be stabilized.

As seen in FIG. 1, at the time of a vehicle collision, after a primary collision in which the vehicle collides against an obstacle, a secondary collision occurs in which the driver collides against the steering member 11. In the secondary collision, an air bag built in the steering member 11 is opened and the driver collides against the air bag to generate a reaction force, thereby the steering member 11 is subjected to impact at least in the axial direction X. However, in the steering system 1, not only is the position of the column jacket 4 held by the clamping mechanism 7 but also the positions of the column jacket 4 and the steering member 11 in the axial direction X are firmly held by the tooth lock mechanism 8. The holding of the column jacket 4 by the tooth lock mechanism 8 is referred to as positive lock.

The positive lock allows binding of the upper jacket 22 to the lower jacket 23 to be stabilized until the guide shaft 90 is sheared at the time of the secondary collision, that is, at an initial stage of the secondary collision. In other words, the initial binding at the time of the secondary collision is stabilized. Consequently, the guide shaft 90 is sheared by being evenly subjected to impact acting in the axial direction X, permitting movement of the upper jacket 22. The tooth member 63 then moves toward the front side X2 along with the tooth plate 61 and the upper jacket 22 to contract the column jacket 4. The impact at the time of the secondary collision is absorbed by a load resulting from shearing of the guide shaft 90 (referred to as a shearing load) and sliding of the upper jacket 22 with respect to the lower jacket 23.

As described above, as seen in FIG. 6, the strength of the meshing between the second teeth 62 and the first teeth 60 is stabilized. Thus, the guide shaft 90 can be stably subjected to the impact at the time of the secondary impact and thus enables a stable shearing load to be generated. Therefore, collision performance such as impact absorption performance at the time of the secondary collision can be stabilized. Now, a variation of the present embodiment will be described.

Figure 9:
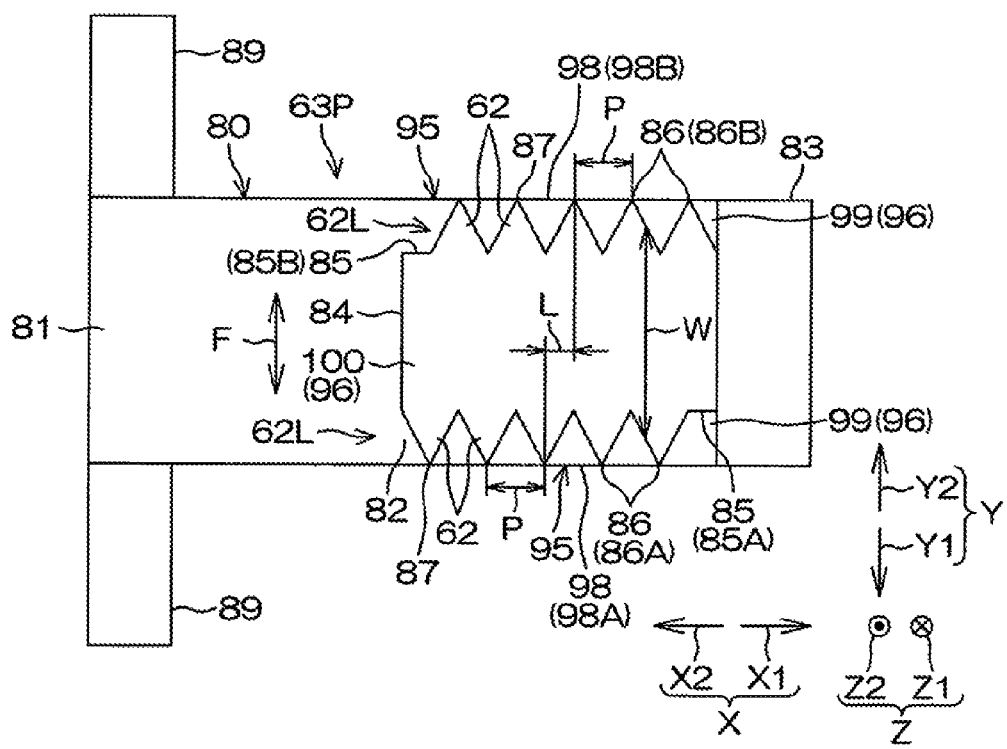
FIG. 9 is a diagram of a tooth member according to a variation of the present embodiment as viewed from below.
Figure 10:
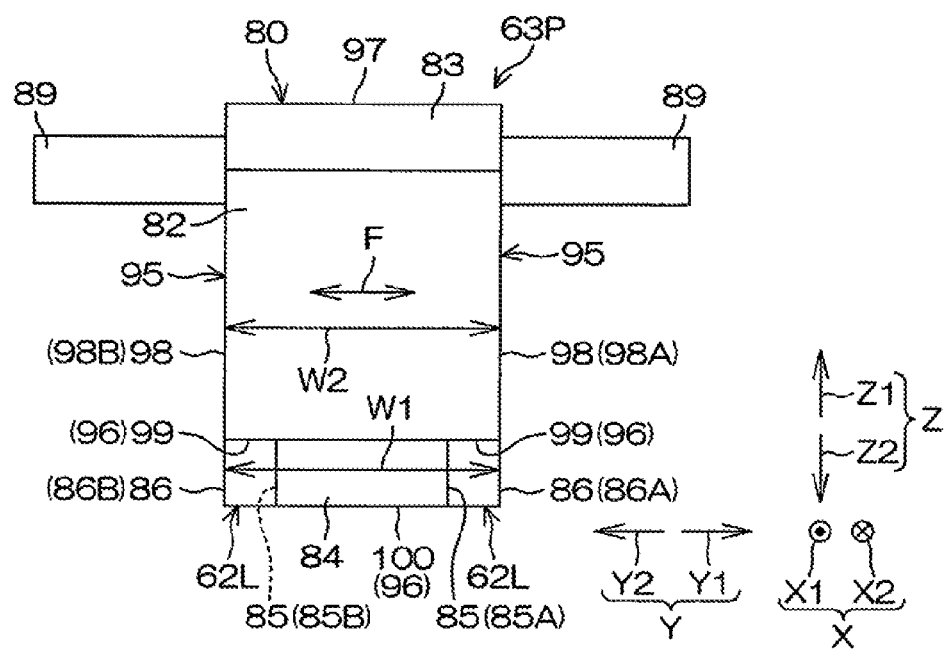
FIG. 10 is a diagram of the tooth member according to the variation of the present embodiment as viewed from rear.

FIG. 9 is a diagram of a tooth member 63P according to a variation of the present embodiment as viewed from the lower side Z2. FIG. 10 is a diagram of the tooth member 63P as viewed from the rear side X1. In FIG. 9 and FIG. 10, members that are the same as those described above are denoted by the same reference numerals and description thereof will be omitted. As seen in FIG. 9 and FIG. 10, the body portion 80 of the tooth member 63P includes, as outer surfaces thereof, a pair of side surfaces 95 and a lower surface 96 and an upper surface 97 that couple the side surfaces 95 together.

The side surfaces 95 are parallel to the lateral direction Y A direction (parallel to the lateral direction Y) in which the side surfaces 95 face is referred to as a facing direction F. Each of the side surfaces 95 of the body portion 80 includes a first surface (the side surface 85 of the tooth forming portion 84) and a second surface 98. The first surface is provided with the second tooth row 62L. In the body portion 80, the second surfaces 98 are each positioned outside the side surface 85 in the facing direction F. The right-side-Y1 first surface corresponds to the right-side-Y1 side surface 85A. The left-side-Y2 first surface corresponds to the left-side-Y2 side surface 85B. The right-side-Y1 second surface 98A is positioned on the right side Y1 with respect to the right-side-Y1 side surface 85A of the tooth forming portion 84. The left-side-Y1 second surface 98B is positioned on the left side Y2 with respect to the left-side-Y2 side surface 85B of the tooth forming portion 84.

The lower surface 96 includes coupling surfaces 99 and a lower surface 100 of the tooth forming portion 84. Each of the coupling surfaces 99 couples the corresponding side surface 85 of the tooth forming portion 84 and the corresponding second surface 98 together. The coupling surface 99 and the lower surface 100 of the tooth forming portion 84 extend in the facing direction F. The second teeth 62 of each second tooth row 62L protrude from the corresponding side surface 85 of the tooth forming portion 84, with the tooth tips 86 directed in the facing direction F. Specifically, the second teeth 62 of the right-side-Y1 second tooth row 62L protrude from the right-side-Y1 side surface 85A toward the right side Y1, with the tooth tips 86A of the second teeth 62 directed toward the right side Y1. The second teeth 62 of the left-side-Y2 second tooth row 62L protrude from the left-side-Y2 side surface 85B toward the left side Y2, with tooth tips 86B of the second teeth 62 directed toward the left side Y2. The second teeth 62 of each second tooth row 62L are coupled to the corresponding coupling surface 99.

In the facing direction F, a distance W1 between the tooth tip 86A of each of the second teeth 62 on the right-side-Y1 side surface 85A and the tooth tip 86B of the corresponding one of the second teeth 62 on the left-side-Y2 side surface 85B is equal to a distance W2 between the second surfaces 98. The tooth tips 86 of the second teeth 62 of each of the second tooth rows 62L are located at the same position as the second surface 98 of the corresponding side surface 95 in the facing direction F. Specifically, the tooth tips 86A in the right-side-Y1 second tooth row 62L are located at the same position as the right-side-Y1 second surface 98A in the facing direction F. The tooth tips 86B in the left-side-Y2 second tooth row 62L are located at the same position as the left-side-Y2 second surface 98B in the facing direction F. In other words, no step is formed between the second surface 98 of each side surface 95 and the tooth tips 86 of the second teeth 62 of the corresponding second tooth row 62L as viewed in the axial direction X.

In this variation, the tooth tips 86 of the second teeth 62 of each second tooth row 62L are located at the same position as the second surface 98 of the corresponding side surface 95. Thus, the thickness of the tooth member 63 in the facing direction F can be made as uniform as possible. Therefore, the shape of the tooth member 63 is simplified to allow the tooth member 63P to be easily shaped by compression molding. Specifically, when the tooth member 63P is shaped by sintering, the structure of a mold used to pressurize powdery metal for sintering (in other words, a mold used for compression molding) can be simplified. Consequently, the tooth member 63P can be easily shaped. The simplified structure of the mold used for compression molding also enables a reduction in mold costs.

The invention is not limited to the above-described embodiment, but various changes may be made to the embodiment within the scope of the claims. For example, the steering system 1 is not limited to the tooth lock mechanism 8 but may include a tooth lock mechanism with a different structure. For example, the guide mechanism 65 may be omitted from the tooth lock mechanism. In this case, each of the extension portions 34 is provided with, instead of the first guide holes 34B through which the support shafts 89 of the tooth member 63 are inserted, support holes that restrict movement of the support shafts 89 in the axial direction X. At the time of the secondary collision, the support shafts 89 are sheared to contract the column jacket 4.

In the tooth members 63, 63P, the right-side-Y1 second tooth row 62L and the left-side-Y2 second tooth row 62L may have different pitches P in the axial direction X. However, even in this case, the first teeth 60 of the right-side-Y1 first tooth row 60L need to be arranged in the axial direction X at a predetermined pitch equal to a pitch for the right-side-Y1 second tooth row 62L. The first teeth 60 of the left-side-Y2 first tooth row 60L need to be arranged in the axial direction X at a pitch equal to a pitch for the left-side-Y2 second tooth row 62L.

The second tooth rows 62L may be omitted from the tooth members 63, 63P. One second tooth 62 may be provided on each of the side surfaces 85.

What is claimed is:

1. A steering system comprising:
    a steering shaft to which a steering member is coupled at an end of the steering shaft and which can extend and contract in an axial direction;
    a column jacket having an upper jacket that is located near the steering member in the axial direction and holds the steering shaft and a lower jacket that is located away from the steering member in the axial direction and holds the steering shaft, the column jacket being enabled to extend and contract in the axial direction along with the steering shaft as a result of movement of the upper jacket with respect to the lower jacket;
    a bracket that supports the lower jacket and that is fixed to a vehicle body;
    an operation member that is operated to restrict extension and contraction of the column jacket;
    a pair of first tooth rows including a plurality of first teeth, the first teeth each having a tooth trace extending in a crossing direction crossing the axial direction, the first teeth being arranged at a predetermined pitch in the axial direction, the first tooth rows extending parallel to each other and being movable integrally with the upper jacket in the axial direction; and
    a tooth member including a block-like body portion supported by the lower jacket and a pair of second teeth provided on a pair of side surfaces of the body portion, the side surfaces extending parallel to each other such that at least one second tooth is provided on each of the side surfaces, the tooth member being shaped by compression molding and moving in accordance with operation of the operation member to allow the second teeth to mesh with the respective first tooth rows, wherein
    the second teeth have tooth tips displaced from each other by a distance shorter than the predetermined pitch.

2. The steering system according to claim 1, wherein the tooth member includes a sintered compact.

3. The steering system according to claim 1, wherein the distance corresponds to half of the predetermined pitch.

4. The steering system according to claim 1, wherein the tooth tip of each of the second teeth is located at the same position as the corresponding side surface in a facing direction in which the side surfaces face.

5. A tooth member comprising:
    a block-like body portion; and
    a pair of tooth portions provided on a pair of side surfaces of the body portion, the side surfaces extending parallel to each other such that at least one tooth portion is provided on each of the side surfaces, wherein
    the tooth portions have tooth tips displaced from each other and are shaped by compression molding, and
    the tooth tips of the pair of tooth portions protrude in opposite directions from the block-like body portion in a facing direction in which the side surfaces face.

* * * * *